United States Patent [19]
Bandel et al.

[11] 3,951,455
[45] Apr. 20, 1976

[54] CUSHIONED SEAT, ESPECIALLY MOTOR VEHICLE SEAT

[75] Inventors: Kurt Bandel, Monchberg; Adolf Honegg, Grafenau-Datzingen; Heinz Stahl, Sindelfingen, all of Germany

[73] Assignee: Daimler-Benz Aktiengesellschaft, Germany

[22] Filed: Apr. 13, 1973

[21] Appl. No.: 350,972

[30] Foreign Application Priority Data
Apr. 13, 1972    Germany............................ 2217791

[52] U.S. Cl................................ 297/452; 297/219; 297/226
[51] Int. Cl.²...................... A47C 7/02; A47C 27/00
[58] Field of Search .................... 297/218–229, 452

[56] References Cited
UNITED STATES PATENTS

| | | | |
|---|---|---|---|
| 1,295,662 | 2/1919 | Witham | 297/226 |
| 1,962,215 | 6/1934 | Sallop | 297/226 X |
| 2,120,036 | 6/1938 | Northup | 297/226 X |
| 2,228,948 | 1/1941 | Field | 297/229 |
| 3,185,523 | 5/1965 | Morrill | 297/226 |
| 3,233,253 | 2/1966 | Cauvin | 297/218 X |
| 3,630,572 | 12/1971 | Homier | 297/219 |
| 3,632,164 | 1/1972 | Radke | 297/219 |
| 3,711,155 | 1/1973 | Bandel et al. | 297/219 |

*Primary Examiner*—Paul R. Gilliam
*Assistant Examiner*—Victor N. Sakran
*Attorney, Agent, or Firm*—Craig & Antonelli

[57]    ABSTRACT

A cushioned seat, especially a motor vehicle seat which includes a spring box, a cushion shaped-part arranged on the spring box, a cover provided with at least one of rows of stitches (seams), stitched junctions (tucks), fused (welded) connections, and tacks on the seat cushion and possibly also on the backrest; a sleeve (hose) constituted by a band is sewed on or welded on in the longitudinal direction of at least one of the rows of stitches, stitched junctions and fused connections whereby the sleeve is disposed in a recess of the cushion shaped-part and includes a rod-shaped retaining member inserted into the sleeve while means are provided at each point of tacking which securely connect the retaining member with the shaped-part of the cushion.

8 Claims, 8 Drawing Figures

U.S. Patent April 20, 1976 3,951,455
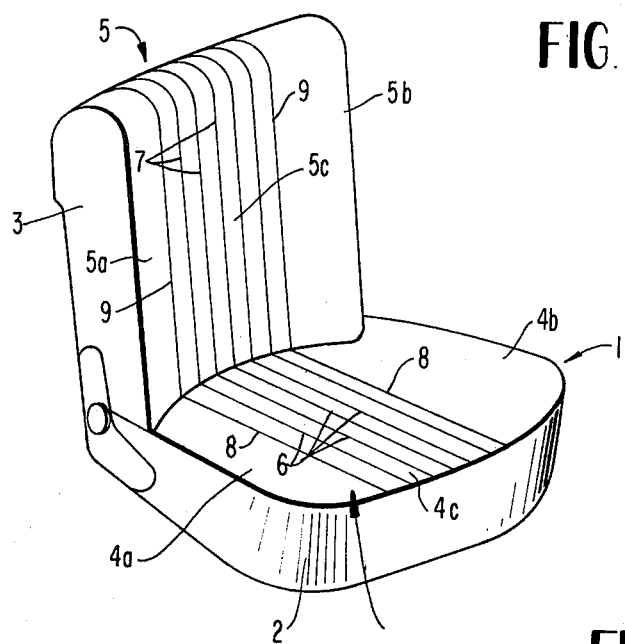
FIG. 1

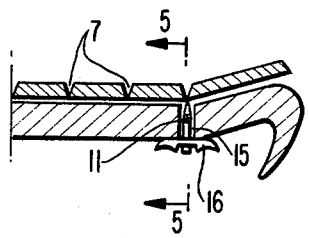
FIG. 4

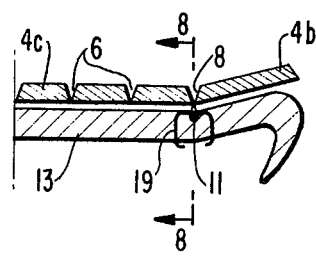
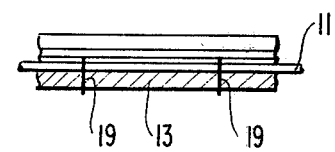
FIG. 7      FIG. 8

CUSHIONED SEAT, ESPECIALLY MOTOR VEHICLE SEAT

The present invention relates to a cushioned seat, especially to a motor vehicle seat, including a spring box, a cushion shaped-part arranged thereon, a cover provided with at least one of rows of stitches, stitched junctions and fused connections and tacks on the seat cushion and possibly on the backrest.

The present invention is concerned with the task to realize measures for the tacking of the cover with the shaped-part of the cushion which, in addition to slight structural expenditures, also enable a far-reachingly mechanical, automated manufacture of the cushion parts to be connected with each other.

The solution of this task essentially consists according to the present invention in that a sleeve formed of a band is sewed-on or welded-on in the longitudinal direction of at least one of the noted rows of stitches, stitched junctions and fused connections, which is disposed in a recess of the formed-part of the cushion and which includes a rod-shaped retaining member inserted into the hose, and in that means are provided at each point of tacking which securely connect the retaining member with the shaped-part of the cushion.

In one advantageous embodiment according to the present invention, the retaining member may be bent-through section-wise in such a manner that the bent-through parts thereof constructed as retaining loops project out of the sleeve, pass through openings arranged in the cushion shaped-part are retained at the cushion shaped-part by clips.

In lieu of this embodiment with a bent-through retaining member, a rectilinear retaining member may also be used according to the present invention, over which are pulled loops which project out of the sleeve at spaced points, pass through the openings arranged in the cushion shaped-part and are retained at the cushion shaped-part by clips.

According to a further preferred embodiment of the present invention, clamps may be provided which extend over the retaining member and are inserted through the shaped-part of the cushion. This type of tacking is suitable also in such cushioned seats which have a closed spring box, and which thus offer no possiblity to extend the tacking through the spring box.

Accordingly, it is an object of the present invention to provide a cushioned seat, especially a motor vehicle seat which avoids by simple means the aforementioned shortcomings and drawbacks encountered in the prior art.

Another object of the present invention resides in a cushioned seat which permits a rapid automatic manufacture of the cushion parts to be connected with each other without entailing undue expenditures.

A further object of the present invention resides in a cushioned seat, especially a motor vehicle seat which can be readily assembled, permitting even far-reaching preassemblies of certain parts thereof.

These and further objects, features and advantages of the present invention will become more apparent from the following description when taken in connection with the accompanying drawing which shows, for purposes of illustration only, several embodiments in accordance with the present invention, and wherein:

FIG. 1 is a perspective view of a motor vehicle seat in accordance with the present invention;

FIG. 4 is a partial cross-sectional view illustrating a tacking of the cover with the cushion formed-part;

FIG. 7 is a partial cross-sectional view through still a further modified embodiment of a tacking by means of clamps at the cushion shaped-part; and FIG. 8 is a partial cross-sectional view of the tacking taken along line VIII—VIII in FIG. 7.

Figure 2:
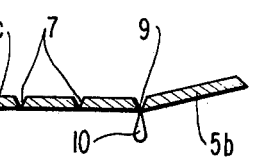
FIG. 2 is a partial cross-sectional view through a cover consisting of three cover parts.
Figure 3:
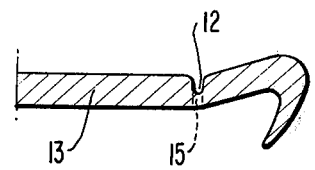
FIG. 3 is a partial cross-sectional view through the shaped-part of the cushion.
Figure 5:
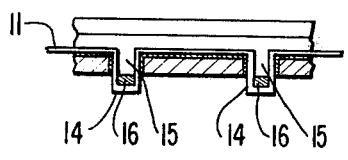
FIG. 5 is a partial cross-sectional view of the tacking at the cushion shaped-part, taken along line V—V in FIG. 4.

Referring now to the drawing wherein like reference numerals are used throughout the various views to designate like parts, a cushioned seat generally designated by reference numeral 1 provided for a motor vehicle consists, according to FIG. 1, of a seat cushion 2 and of a backrest 3. The covers 4 and 5 for the seat cushion 2 and the backrest 3 which each consist of three sewn together cover parts 4a, 4b and 4c and 5a, 5b and 5c, respectively are provided with stitched junctions (tucks) or ribbings 6 and 7 and row of stitches (seams) indicated at 8 and 9, of which the rows of stitches include in the longitudinal direction a sewed-on textile sleeve 10 into which is inserted a rod-shaped retaining member 11 (FIG. 4) extending over the entire length of the sleeve. The sleeve 10 illustrated in FIG. 2 is placed into a recess 12 (FIG. 3) of a shaped part 13 of the cushion, which recess is provided especially for the sleeve. The retaining member 11 includes bent U-shaped sections whereby the bent portions 14 which have the function of retaining loops, project out of slots provided in the sleeve 10 for such a distance that they extend through apertures 15 arranged in the cushion shaped-part 13—as can be seen from FIGS. 4 and 5—and are fixed at the bottom side of the cushion shaped-part 13 by means of clips 16 extended through the retaining loops 14 and preferably consisting of synthetic plastic material.

This embodiment of the tacking is preferably provided at the backrest 3.

Figure 6:
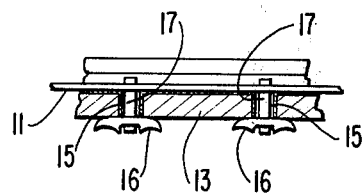
FIG. 6 is a partial cross-sectional view, similar to FIG. 4, illustrating a modified embodiment of a tacking by means of loops which are retained at the cushion shaped-part by clips.

However, also the arrangement of the tacking according to FIG. 6 is principally provided for the backrest 3. The rod-shaped retaining member 11 inserted into the sleeve 10 is not bent in this embodiment. In lieu of the bent portions 14 of FIG. 5 which extend through the apertures 15 of the cushion shaped-part 13, textile loops 17 are provided which are pulled over the retaining member 11 and also project out of the slots in the sleeve 10. The loops 17 are also fixed at the bottom side of the shaped-part 13 of the cushion by clips 16 consisting of synthetic plastic material.

Tackings are shown in FIGS. 7 and 8 which are preferably used for seat cushions 2. In this embodiment, clamps 19 serve as fastening material which are extended through the sleeve 10 and through the cushion shaped-part 13, without pre-fabrication of slits in the sleeve and without prefabrication of apertures in the cushion shaped-part, in such a manner that they extend over the retaining member 11 whereby the ends of the staples 19 projecting out of the cushion shaped-part 13 are bent off at the bottom side of the cushion-shaped part.

The last-mentioned arrangement of tacking which is inexpensive and time-saving, may be carried out already prior to the assembly of the shaped-part of the cushion on the spring box which is possibly constructed as a closed spring box, which means that the covers and the cushion shaped-part can be completely pre-assembled.

The manufacture of the cushioned seat then takes place in a simple manner.

The arrangement of the sleeve and of the inserted retaining member at the seam of two joined cover parts and the different types of embodiments of the tackings assure a completely satisfactory seating of the cover which extends over the entire length of the sleeve, whereby the seating is extraordinarily suitable, especially for strongly inwardly curved seat cushions and backrests whose safety-increasing shape far-reachingly prevents the driver and the passenger from sliding out when travelling fast through curves.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A cushioned seat comprising:
    a spring box;
    a seat cushion disposed on said springbox including a cushion shaped part having a top side surface and an underside surface;
    cover means for covering said seat cushion including a plurality of individual cover sections joined along seams extending in a longitudinal direction of said seat cushion; s
    sleeve members attached to said cover means at least along the seams thereof;
    slot means provided in said sleeve members;
    recess means formed in said topside of said cushion shaped part for receiving said sleeve members;
    aperture means formed in said cushion shaped part;
    rod means inserted into said sleeve members including retaining loops projecting through said slot means in said sleeve members and extending through said aperture means in said cushion shaped part; and
    clamping means extending through said retaining loops for fixedly clamping said retaining loops at said underside surface of said cushion shaped-part.

2. A cushioned seat according to claim 1, wherein the cushioned seat is a motor vehicle seat.

3. A cushioned seat according to claim 1, wherein said seam in said cover means are formed by rows of stitches.

4. A cushioned seat according to claim 1, wherein said seams in said cover means are formed of stitched junctions.

5. A cushioned seat according to claim 1, wherein said seams in said cover means are formed of fused connections.

6. A cushioned seat according to claim 1, wherein the rod means is rigid.

7. A cushioned seat according to claim 6, wherein said sleeve members are welded-on said cover means along said seams and are substantially continuous along its length.

8. A cushioned seat according to claim 6, wherein said sleeve members are welded-on said cover means along said seam and surround said rod means along its length.

* * * * *